United States Patent
Kimura

(10) Patent No.: US 9,460,061 B2
(45) Date of Patent: Oct. 4, 2016

(54) PRINT SYSTEM, PRINT SERVER, CONTROL METHOD, AND STORAGE MEDIUM

(71) Applicant: CANON KABUSHIKI KAISHA, Tokyo (JP)

(72) Inventor: Mitsuo Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 599 days.

(21) Appl. No.: 13/752,798

(22) Filed: Jan. 29, 2013

(65) Prior Publication Data

US 2013/0212464 A1    Aug. 15, 2013

(30) Foreign Application Priority Data

Feb. 14, 2012    (JP) ................. 2012-029013

(51) Int. Cl.
| | |
|---|---|
| *G06F 17/21* | (2006.01) |
| *G06F 17/22* | (2006.01) |
| *G06F 17/30* | (2006.01) |
| *G06F 3/12* | (2006.01) |
| *G06F 17/24* | (2006.01) |

(52) U.S. Cl.
CPC ......... *G06F 17/2247* (2013.01); *G06F 3/1206* (2013.01); *G06F 3/1228* (2013.01); *G06F 3/1265* (2013.01); *G06F 3/1288* (2013.01); *G06F 17/30899* (2013.01)

(58) Field of Classification Search
CPC ................................. G06F 17/2247
USPC ....................................... 715/234
See application file for complete search history.

(56) References Cited

U.S. PATENT DOCUMENTS

| | | | |
|---|---|---|---|
| 6,738,841 B1 * | 5/2004 | Wolff ............................... | 710/62 |
| 6,886,028 B1 * | 4/2005 | Matsuyama et al. ......... | 709/203 |
| 7,755,785 B2 | 7/2010 | Lee | |
| 8,224,970 B2 | 7/2012 | Nishiyama | |
| 2004/0190049 A1 * | 9/2004 | Itoh .............................. | 358/1.15 |
| 2007/0273923 A1 * | 11/2007 | Kimura ........................ | 358/1.15 |
| 2009/0119602 A1 | 5/2009 | Nishiyama | |
| 2010/0171973 A1 * | 7/2010 | Kimura ................. | G06F 3/1204 358/1.14 |

(Continued)

FOREIGN PATENT DOCUMENTS

| | | |
|---|---|---|
| CN | 101059754 A | 10/2007 |
| CN | 102023987 A | 4/2011 |

(Continued)

OTHER PUBLICATIONS

Chinese Office Action issued in corresponding application No. 201310052244.X on Jun. 3, 2015.

*Primary Examiner* — James J Debrow

(74) *Attorney, Agent, or Firm* — Carter, DeLuca, Farrell & Schmidt, LLP

(57) ABSTRACT

A webpage print server transmits script to a client terminal that has run a bookmarklet, and the client terminal that has run the script transmits an HTML of a webpage under display by a web browser to the webpage print server. In the case where the webpage print server was unable to acquire the external files in accordance with an external file reference command contained in this HTML, the webpage print server transmits script that causes acquisition of external files to the client device, and the webpage print server acquires the external files from the client device. The webpage print server then generates printing data based on the acquired external files and the aforementioned HTML.

9 Claims, 12 Drawing Sheets

(56) References Cited

U.S. PATENT DOCUMENTS

2010/0171982 A1* 7/2010 Sato .............................. 358/1.15
2011/0134466 A1* 6/2011 Nakagawa ................... 358/1.15
2012/0194844 A1* 8/2012 Natori ................... G06F 3/1205
                        358/1.13

FOREIGN PATENT DOCUMENTS

JP  H11-161539 A  6/1999
JP  2009-116630 A  5/2009

* cited by examiner

```
<HTML>
    <HEAD>
        <META http-equiv=Content-Type content=text/html:charaet=UTF-8>
        <BASE href=http://can.jp/target=_blank>
        <TITLE>Homepage</TITLE>
        <LINK media=screen,print href="css/i-index-a.css" type=text/caa rel=atyleaheet>
    </HEAD>         508                              509
    <BODY>
        <IMG height=350 src="http://can.jp/img/index/kye-visual/photo/weekend.jpg" width=622>
        <IMG height=172 src="http://can.jp/img/index/kye-visual/txt/weekend.gif" width=214>
        <A href="http://www.imagegatway.net/photopreaao">
            <IMG height=181 arc="http://can.jp/img/index/key-visual/btn/weekend.jpg" width=228>
        </A>
        <H2>                           504      503    502
            New product information
        </H2>
        <UD>
            <LI>December 5, 2011
                <A href="http://cweb.can.jp/Newarelease/2011-12/pr-aela.html">
                    <IMG height=60 alt=' ' src"http://can.jp/img/index/aela.png" width=60>
                    Marketing of sample preparation device for electron microscopes.
                </A>                                                        505
            </L1>
            <LI>November 24, 2011
                <A href="http://cweb.can.jp/newareleaae/2011-11/pr-myprint.html">
                    <IMG height=60 alt=' ' src="http://can.jp/img/index/myprint.png" width=60>
                    Marketing of application software for multi-purpose equipment.
                </A>                                                   506
            </L1>
            <LI>November 10, 2011
                <A href="http://cweb.can.jp/newarelease/2011-11/pr-paa100.html">
                    <IMG height=60 alt=' ' src="http://can.jp/img/index/paa100.png" width=60>
                    Marketing of digital cameras which achieve higher picture quality.
                </A>                                                  507
            </L1>
        </UL>
    </BODY>
</HTML>
```

| http://can.jp/css/i-index-s.css |
| http://can.jp/img/index/key-visual/photo/weekend.jpg |
| http://can.jp/img/index/key-visual/txt/weekend.gif |
| http://can.jp/img/index/key-visual/btn/weekend.jpg |
| http://can.jp/img/index/sela.png |
| http://can.jp/img/index/myprint.png |
| http://can.jp/img/index/pss100.png |

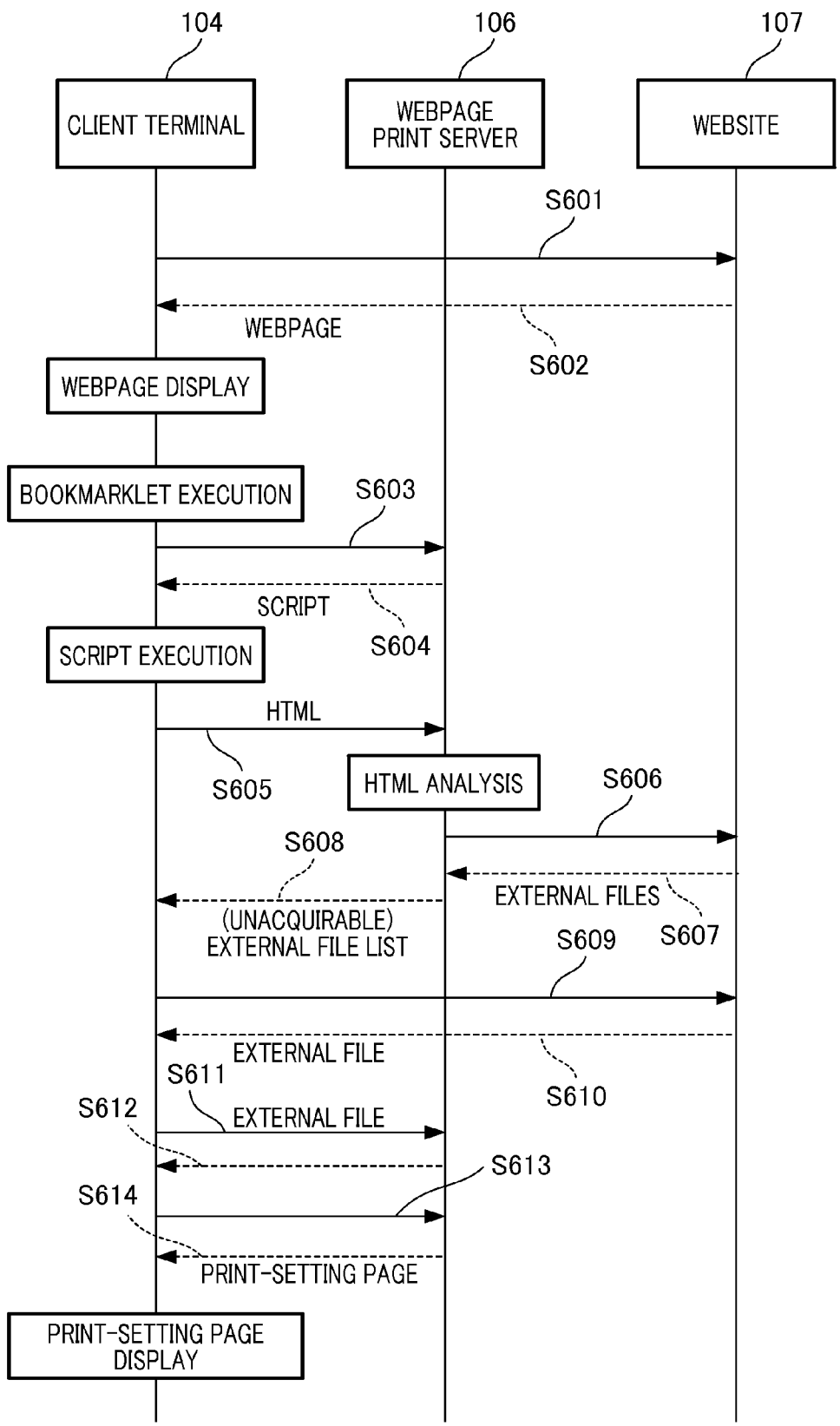

PRINT SYSTEM, PRINT SERVER, CONTROL METHOD, AND STORAGE MEDIUM

BACKGROUND OF THE INVENTION

1. Field of the Invention

The present invention relates to a print system, a print server, a control method, and a storage medium.

2. Description of the Related Art

A program called a bookmarklet can be recorded in a bookmark of a web browser. When a bookmarklet is run, script is downloaded from the website that provides the bookmarklet, and is loaded into the webpage being displayed.

By running a bookmarklet, a user can utilize various functions provided by a website in the webpage being displayed by the web browser. For example, there are bookmarklets which provide functions that freely modify the webpage being displayed. When such a bookmarklet is used, unnecessary parts of the webpage under display are deleted, after which it is possible to print only the necessary parts of the webpage with the print function of the web browser.

The print function of the web browser is implemented by an OS (operating system) function. For example, when a print command is issued in an operative web browser in Windows®, printing data is generated using a printer driver that conforms to the selected printer, and is transmitted to the printer via an OS print spooler.

As a method for transmitting the information of a webpage, Japanese Patent Application Laid-Open No. 2009-116630 discloses a system in which the display screen of a webpage is captured, and transmitted as image data. Moreover, Japanese Patent Application Laid-Open No. 11-161539 discloses a system in which the HTML and all HTML-related files of a webpage are collectively transferred.

However, as the methods of Japanese Patent Application Laid-Open No. 2009-116630 and Japanese Patent Application Laid-Open No. 11-161539 cannot be implemented with the standard functions of an ordinary web browser alone, it is necessary to either use a dedicated web browser, or install a dedicated program that is separate from the web browser. As it is necessary to prepare a dedicated web browser or program for each platform, high development costs would be incurred in order to cover all platforms in which a web browser operates. Moreover, with terminals such as mobile terminals that have little memory and low CPU performance, there may be cases where programs other than the web browser are unable to operate.

Now, it is possible to transmit the HTML of a webpage under display to a server with the standard functions of a web browser alone, provided that a bookmarklet is used. By running a bookmarklet, script is downloaded from a server, and is loaded into the webpage being displayed. The HTML is then transmitted to the server according to the script loaded into the webpage.

Depending on the security specifications of the web browser, it may be impossible to access the external files of an image or the like that are referenced in the HTML under display from a script that is loaded into the webpage. In such cases, it is necessary for the server that is receiving the HTML to interpret the HTML, and to acquire the external files that are referenced in the HTML.

External files are files which are referenced in the HTML with descriptions like that given in the following example.

Image file: <IMG src="http://can.jp/img/img.jpg">
Stylesheet file: <LINK href="http://can.jp/css/style.css" rel="stylesheet" type="text/css">
Script file: <script type="text/javascript" src="http://can.jp/js/aaa.js">

However, there are cases where the server is unable to acquire external files. For example, the server would be unable to acquire external files from a website requiring a cookie held by a web browser when acquiring external files of a webpage of a membership system or the like. Also, the server would be unable to access a cookie held by a web browser from script loaded into the webpage due to the security specifications of the web browser. Accordingly, it would also be impossible to transmit the cookie to the server.

Also, in cases where accessing clients are restricted on the website side by IP address or the like, the server would be unable to acquire external files if access from the server side were not allowed.

There are also cases where the web browser is unable to reacquire externals file that have once been acquired. For example, in the case of a website where an image file being referenced in the HTML is dynamically generated, and can only be returned once, it would be impossible for the web browser to reacquire an image file that had once been acquired. A website which dynamically generates a video image such as a graph based on the latest data would correspond thereto. With such websites, the name of the image file that is referenced in the HTML changes whenever the HTML is acquired, and a file of the same name could not be acquired twice.

SUMMARY OF THE INVENTION

The print system of the present invention carries out print processing of a webpage under display by a web browser of a user device without installation of a dedicated program into the user device.

The print system of the present embodiment includes a user device, and a print server which communicates with the aforementioned user device via a network. The print server includes: an interpretation unit configured to interpret an HTML of a webpage that is transmitted together with a print request from the user device, and that is displayed by a web browser of the user device; a script transmission unit configured to transmit a script that causes acquisition of external data to the user device, in the case where the external data could not be acquired when acquiring the pertinent external data in accordance with an external data reference command that is contained in the HTML obtained as a result of the aforementioned interpretation; and a generation unit configured to acquire external data from the user device who acquired the external data by running the aforementioned script received from the print server, and to generate printing data corresponding to a webpage displayed by a web browser of the user device based on the acquired external data and the aforementioned HTML.

Further features of the present invention will become apparent from the following description of exemplary embodiments with reference to appended drawings.

BRIEF DESCRIPTION OF THE DRAWINGS

FIG. 5A shows an example of an HTML that configures a webpage.

FIG. 5B shows an exemplary external file list.

FIG. 6 is a drawing which describes an example of operational processing of a print system.

DESCRIPTION OF THE EMBODIMENTS

Figure 1:
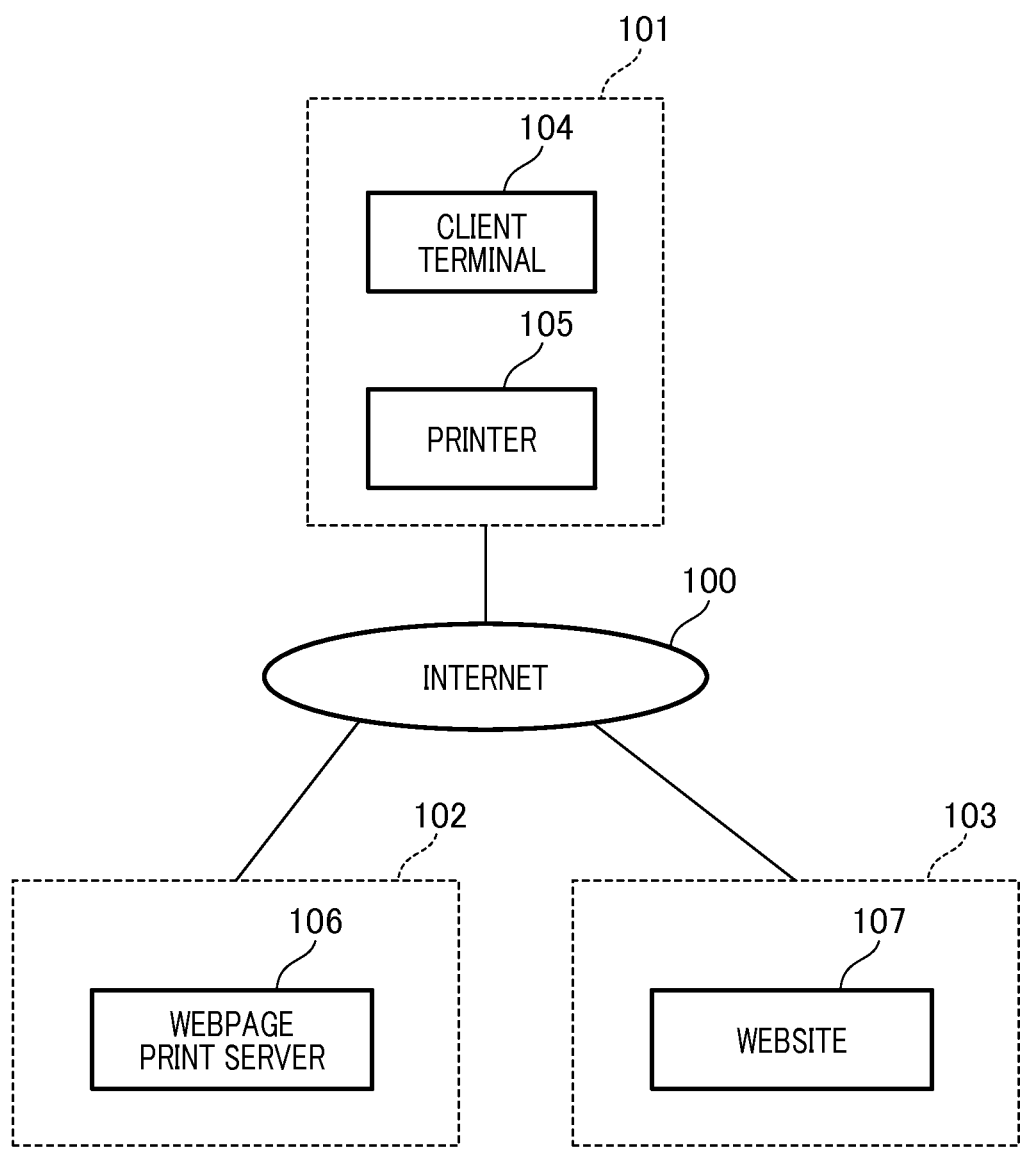
FIG. 1 shows an exemplary configuration of the print system of the present embodiment.

FIG. 1 is a diagram which shows an exemplary configuration of the print system of the present embodiment. The print system shown in FIG. 1 is provided with systems 101 to 103 connected via an internet 100. The system 101 is an intranet system of a corporation or the like, i.e., a local system.

The system 101 is provided with a client terminal 104 and a printer 105. The client terminal 104 and the printer 105 are connected via communication lines that are not illustrated in the drawing. The communication lines are a communications network constituted by, for example, LAN, WAN, telephone lines, dedicated digital lines, ATM or frame relay lines, cable television lines, wireless data broadcast lines, or the like, used alone or in combination. LAN is an abbreviation for Local Area Network. WAN is an abbreviation for Wide Area Network. ATM is an abbreviation for Asynchronous Transfer Mode. In FIG. 1, the client terminal 104 and the printer 105 are respectively provided as single units, but it is also acceptable to respectively provide the client terminal 104 and the printer 105 as multiple units.

The client terminal 104 is the user device of the present embodiment. The client terminal 104 is, for example, a desktop personal computer, a notebook personal computer, a mobile personal computer, a PDA (personal data assistant), or the like. The client terminal 104 may also be a mobile phone incorporating the operating environment of the program. The printer 105 is a printer (e.g., a laser printer) or MFP (multifunction peripheral) that can be connected to a network.

The systems 102 and 103 are systems provided in a data center. The systems 102 and 103 are provided, for example, in a cloud network. The system 102 is provided with a webpage print server 106. The webpage print server 106 is the print server of the present embodiment. The webpage print server 106 communicates with the client device via a network. For example, the webpage print server 106 generates printing data upon receipt of a webpage printing request from the client terminal 104, and transmits it to the printer 105. The system 103 is provided with a website 107. The website 107 returns the webpage upon receipt of a request from the client terminal 104.

Figure 2A:
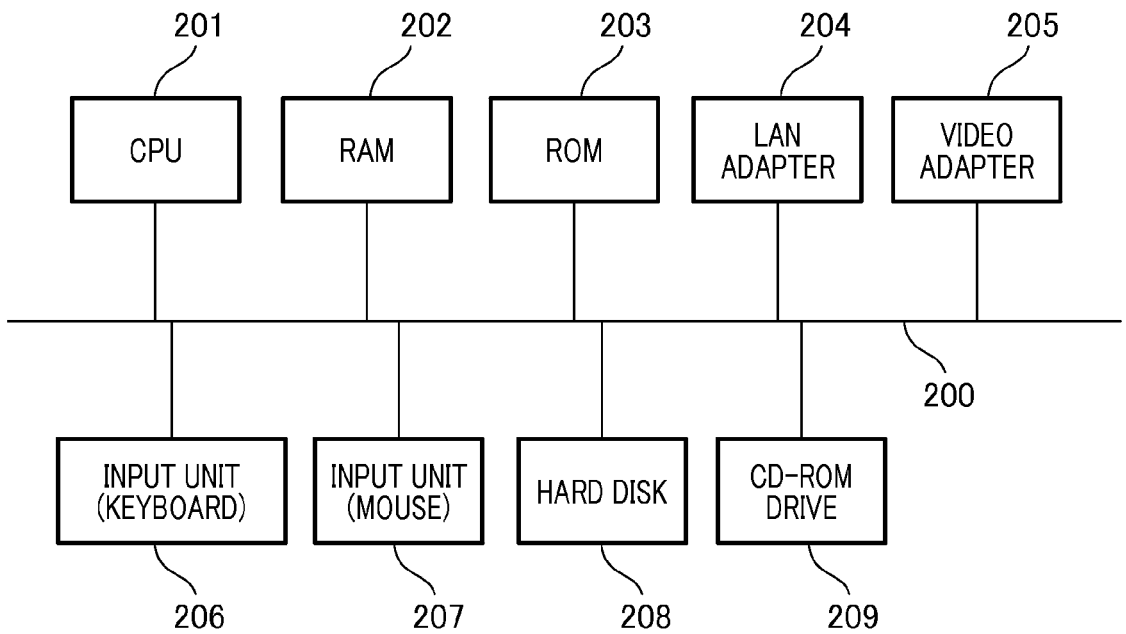
FIG. 2A is an exemplary hardware configuration of a webpage print server.
Figure 2B:
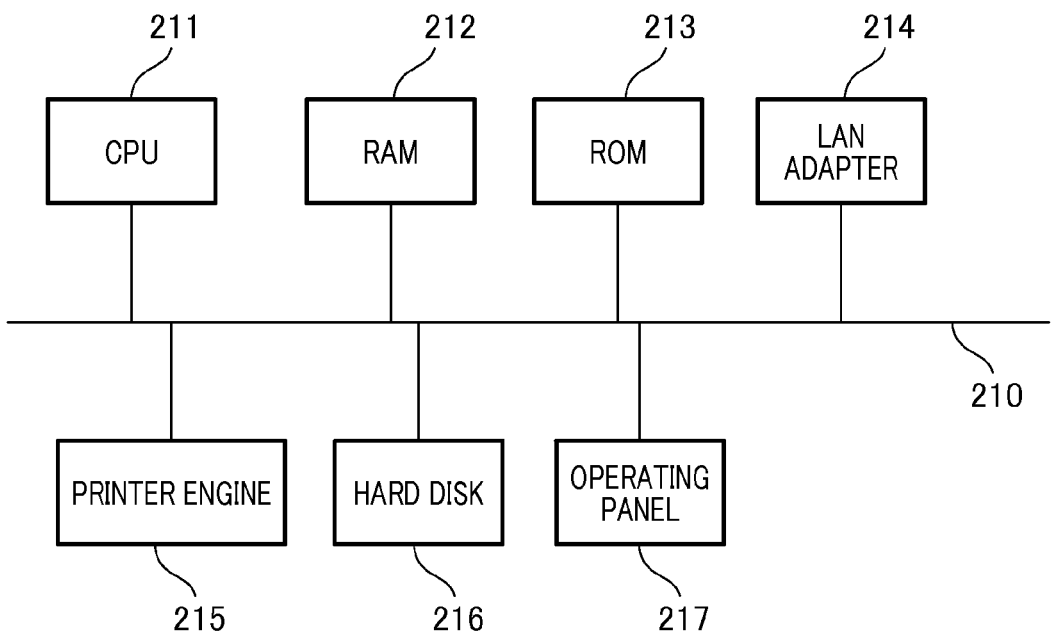
FIG. 2B is an exemplary hardware configuration of a printer.

FIG. 2A and FIG. 2B are diagrams which show exemplary hardware configurations of a webpage print server and a printer. FIG. 2A shows an exemplary hardware configuration of the webpage print server 106. The webpage print server 106 is provided with a CPU 201, a RAM 202, a ROM 203, a LAN adapter 204, a video adapter 205, an input unit (keyboard) 206, an input unit (mouse) 207, a hard disk 208, and a CD-ROM drive 209. There is interconnection from the CPU 201 to the CD-ROM drive 209 via the system bus 200. The system bus 200 has, for example, a PCI bus, AGP bus, memory bus, and the like. Note that FIG. 2A omits input/output interfaces such as connection chips or keyboard interfaces—so-called SCSI or ATAPI—between the respective buses.

The CPU 201 conducts control of various types of hardware and arithmetic operations such as the four arithmetic operations and comparison operations based on an operating system program or application program. The RAM 202 stores an operating system program, application program or the like loaded from a storage medium such as a CD-ROM or CD-R with which the hard disk 208 or CD-ROM drive 209 is provided. The CPU 201 runs these programs.

The ROM 203 stores a so-called BIOS or the like that cooperates with the operating system so as to controls data input/output vis-à-vis the hard disk 208 and the like. The LAN adapter 204 cooperates with a communications program of the operating system controlled by the CPU 201 to conduct communication with external devices connected via the network. The video adapter 205 generates image signals which are output to a display device. The keyboard 206 and mouse 207 are used to input instructions to the client terminal 104.

The hard disk 208 stores operating programs or application programs (e.g., a print system program or the like of the present invention). The CD-ROM drive 209 is loaded with a storage medium such as a CD-ROM, CD-R, or CD-R/W, and is used to install application programs onto the hard disk 208. It should be noted that the webpage print server 106 may be provided with a CD-R drive, CD-R/W drive, DVD drive, or the like.

FIG. 2B shows an exemplary hardware configuration of the printer 105. The printer 105 is provided with a CPU 211, a RAM 212, a ROM 213, a LAN adapter 214, a printer engine 215, a hard disk 216, and an operating panel 217. There is interconnection from the CPU 211 to the operating panel 217 via a system bus 210. The system bus 210 is similar to the system bus 200 shown in FIG. 2A.

The CPU 211 runs the software stored in the hard disk 216 using the RAM 212 as the working memory. It also sets the operations of the printer 105 according to user instructions that are input from the operating panel 217. In addition, the CPU 211 generates image data based on printing data that is input from an external device via the LAN adapter 214, and supplies it to the printer engine 215 to conduct printing. The ROM 213 stores a so-called BIOS or the like that controls data input/output vis-à-vis the hard disk 216 and the like.

Figure 3:
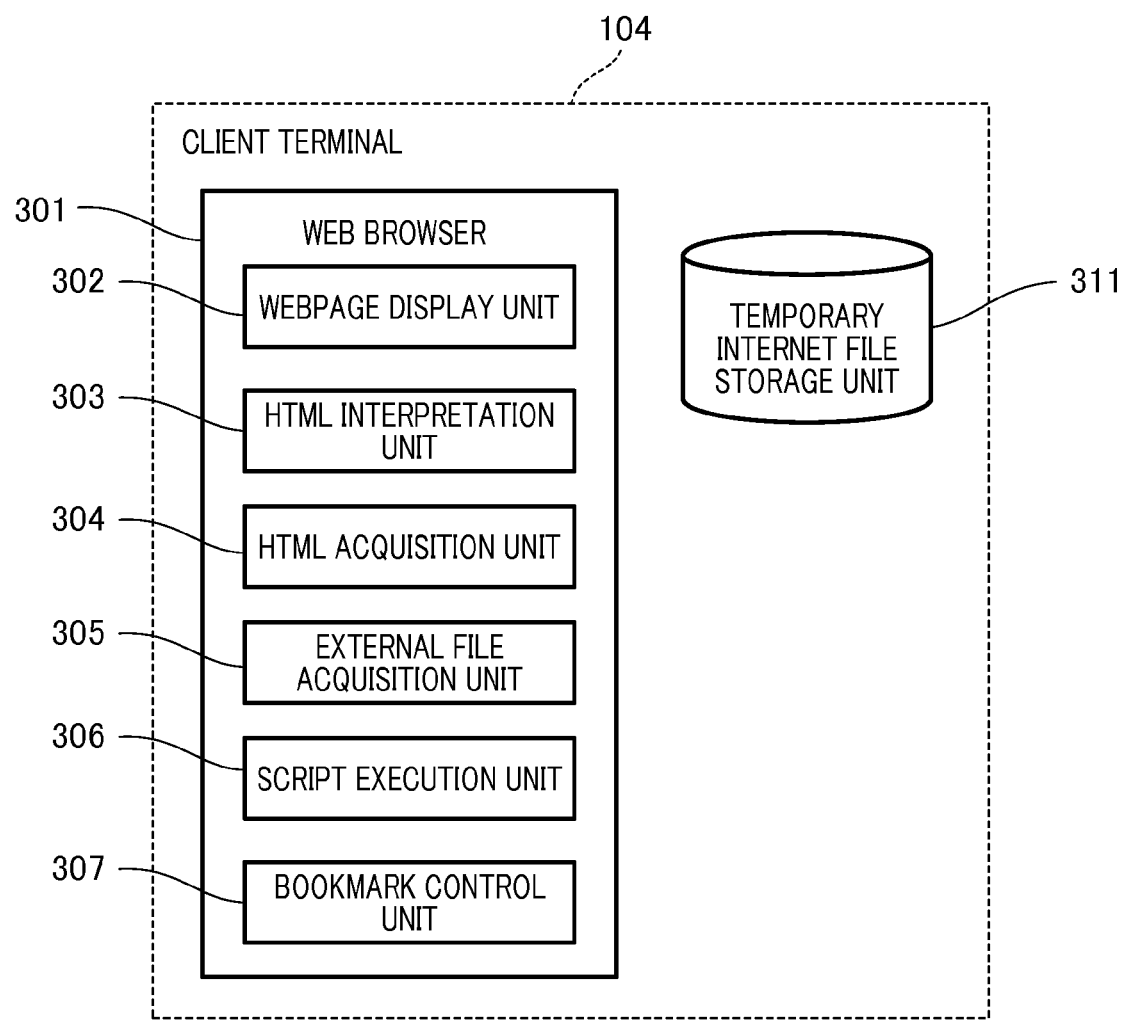
FIG. 3 is an example of a functional block diagram of a client terminal.

FIG. 3 is an example of a functional block diagram of a client terminal. The client terminal 104 is provided with a web browser 301 and a temporary internet file storage unit 311. The web browser 301 acquires the HTML (Hypertext Markup Language) and the external file(s) configuring the webpage from the website 107. An external file is a file with external data that is referenced in the HTML. The external file is, for example, a video file, stylesheet file, or script file. In the present embodiment, the external file is not limited to a video file, stylesheet file, or script file, and may be any file that can be referenced in an HTML. The HTML and the external file(s) acquired by the web browser 107 are stored by the temporary internet file storage unit 311 as temporary internet files.

The web browser 301 is provided with a webpage display unit 302, an HTML interpretation unit 303, an HTML acquisition unit 304, an external file acquisition unit 305, a script execution unit 306, and a bookmark control unit 307. The webpage display unit 302 displays the webpage on a UI (user interface). The HTML acquisition unit 304 acquires the HTML configuring the webpage. The HTML interpretation unit 303 interprets the acquired HTML. The external file acquisition unit 305 acquires the external(s) file configuring the webpage. The script execution unit 306 runs the scripts contained in the webpage. The bookmark control unit 307 manages the bookmarks.

Figure 4:
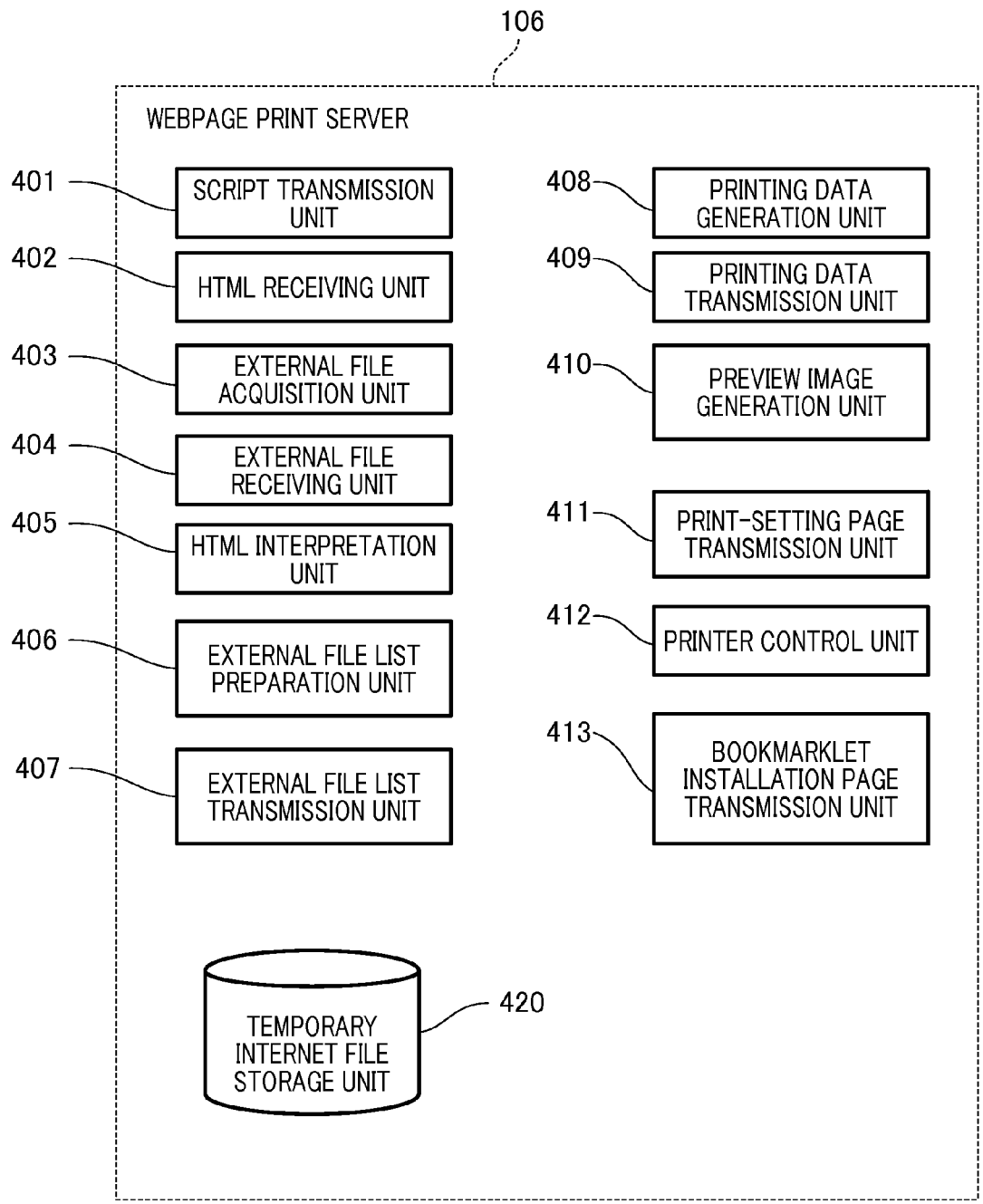
FIG. 4 is an example of a functional block diagram of a webpage print server.

FIG. 4 is an example of a functional block diagram of a webpage print server. The webpage print server 106 is provided with a script transmission unit 401, an HTML receiving unit 402, an external file acquisition unit 403, an external file receiving unit 404, an HTML interpretation unit 405, an external file list preparation unit 406, and an external file list transmission unit 407. In addition, the webpage print server 106 is provided with a printing data generation unit 408, a printing data transmission unit 409, a preview image generation unit 410, a print-setting page transmission unit 411, and a printer control unit 412. The webpage print server 106 is also provided with a bookmarklet installation page transmission unit 413, and a temporary internet file storage unit 420. The control method of the present embodiment is implemented by the functions of the respective processing units with which the webpage print server 106 is provided, and a computer program of the present embodiment causes this control method to be run by the computer.

The temporary internet file storage unit 420 temporarily stores the HTML and the external file(s) configuring the webpage. The script transmission unit 401 transmits scripts to the client terminal 104. The HTML receiving unit 402 receives the HTML from the client terminal 104. The HTML interpretation unit 405 interprets the HTML.

The external file receiving unit 404 receives external files from the client terminal 104. The external file list preparation unit 406 drafts a list of the external files referenced by the HTML that was interpreted by the HTML interpretation unit 405. The external file list preparation unit 406 drafts the external file list in accordance with an external data reference command that is contained in the HTML. An external data reference command is a command that issues an instruction to acquire external files. The external file acquisition unit 403 acquires the external files included in the prepared external file list from the website 107. The external file acquisition unit 403 also deletes the URLs of acquired external files from the external file list prepared by the external file list preparation unit 406.

The external file list transmission unit 407 transmits the external file list that was prepared by the external file list preparation unit 406, and that was updated by the external file acquisition unit 403 to the client terminal 104. The printing data generation unit 408 generates printing data from the webpage. The printing data transmission unit 409 transmits the printing data to the printer 105. The preview image generation unit 410 generates a preview image from the webpage. A preview image is a print preview image that serves to confirm an image at the time of printing.

The print-setting page transmission unit 411 transmits a print-setting page 1001 contained in a preview image to the client terminal 104. The printer control unit 412 manages the printer 105. The bookmarklet installation page transmission unit 413 transmits a bookmarklet installation page to the client terminal 104.

FIG. 5A and FIG. 5B are drawings which show an example of an HTML configuring a webpage, and an example of an external file list. FIG. 5A shows an example of an HTML configuring a webpage. FIG. 5B shows an example of an external file list. The external file list shown in FIG. 5B is a list of the files required to configure the webpage. The external file list is obtained by interpreting the HTML by the HTML interpretation unit 303 with which the web browser of the client terminal 104 is provided.

The external file list 510 shown in FIG. 5A contains the URLs of image files of images displayed by the web browser. The URLs of the image files are extracted from the src attributes shown by codes 502 to 507 of the IMG tag in FIG. 5A. The external file list 510 also contains the URLs of external files designated by a LINK tag.

The external files designated by the LINK tag include stylesheet files or the like that serve to designate the layout of the webpage. The HTML interpretation unit 303 adds a relative path 509 designated by the href attributes of the LINK tag to the URL 508 designated by the href attributes of the BASE tag. By this means, the HTML interpretation unit prepares the URLs of the external files designated by the LINK tag.

In order to apply a stylesheet file, it is necessary to insert a DIV tag into the HTML shown in FIG. 5A to enable detailed designation of the scope of application of the style, but a DIV tag has been omitted in FIG. 5A.

The external file list shown in FIG. 5B basically includes all external files required to configure the webpage. For example, although not included in the HTML of FIG. 5A, the URLs of script files are included in the external file list in the case of an HTML in which script files are designated with a SCRIPT tag. Moreover, in the case where a separate stylesheet file is additionally referenced in a stylesheet file, the URL of the referenced script file would also be included in the external file list.

Figure 13:
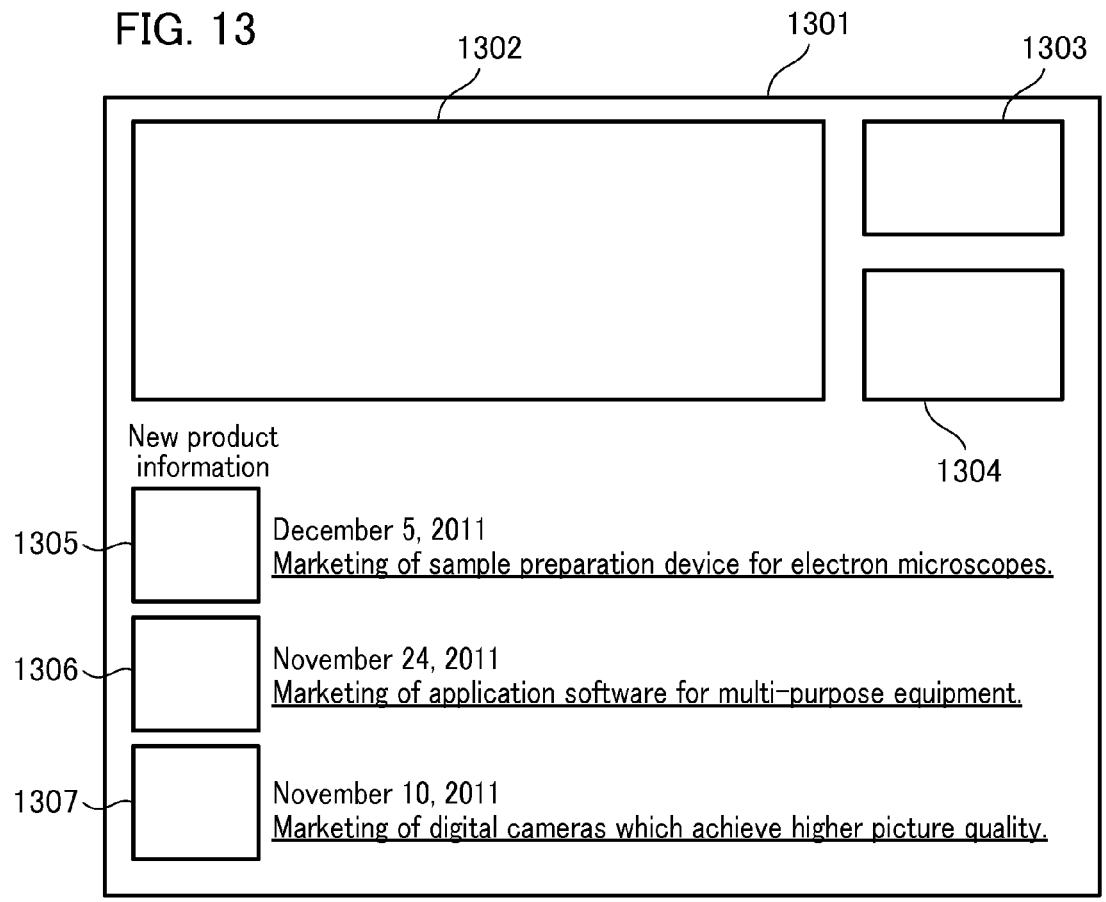
FIG. 13 shows an exemplary screen display of an HTML.

FIG. 13 is a drawing that shows an exemplary screen display of the HTML of FIG. 5A. The web browser acquires the image files shown by the URLs 502 to 507 contained in the HTML 501 in FIG. 5A, and displays them as images 1302 to 1307. The arrangement of images and text in FIG. 13 results from application of the stylesheet file shown by the URL obtained by adding the relative path 509 to the URL 508.

Figure 12:
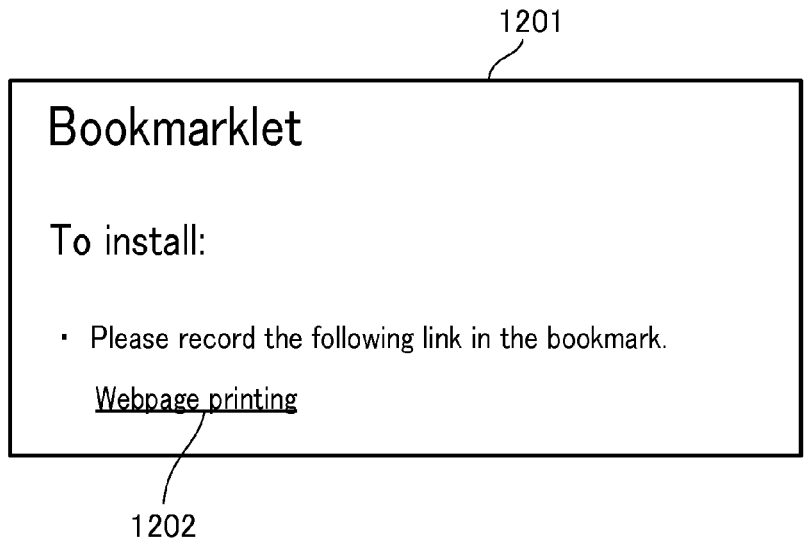
FIG. 12 is an example of a bookmarklet installation page.

FIG. 6 is a sequence diagram which describes an example of operational processing of the print system of the present embodiment. The user records in advance the bookmarklet provided by the webpage print server 106 in the bookmark of the web browser 301. Specifically, the bookmarklet installation page transmission unit 413 functions as a delivery unit which delivers a bookmarklet installation page 1201 shown in FIG. 12 to the web browser 301 in accordance with a request from the web browser 301. The bookmarklet installation page 1201 is screen data which is used to record the bookmarklet in the web browser 301. The user records a link 1202 in the web browser 301. For example, the user records "webpage printing" in the bookmark.

In an ordinary bookmark, the URL of a website is set, but when the link 1202 is recorded as the bookmark, script is set as the bookmark. A bookmark in which script is set is referred to as a bookmarklet. In the present embodiment, the bookmarklet is a program which acquires script from the webpage print server 106 that is recorded in advance in the web browser 301, and that conducts processing related to printing of a webpage displayed by the web browser 301.

The content of a script (script A) that is set in the bookmark "webpage printing" is shown as follows.

```
javascript:((function( ) {
window._print_home = 'http://can.jp';
var s = document.createElement('script');
s.setAttribute('type', 'text/javascript');
s.setAttribute('charset', 'UTF-8');
s.setAttribute('src', window._print_home +
'/js/print.js');
document.documentElement.appendChild(s);
}) ( ))
```

When the user selects the bookmark "webpage printing" from the list of bookmarks in a state where a webpage is displayed in the web browser 301, script A is run. Script A conducts processing which inserts the following text (text A) at the end of the HTML of the webpage under display.
<script type="text/javascript" charset="UTF-8" src="http://ddd.jp/js/print.js">
Text A signifies that the script file shown by the URL (http://ddd.jp/js/print.js) is acquired, and run. As a result of the insertion of text A into the HTML of the webpage under display, the web browser 301 acquires, and runs the script file (print.js) shown by the URL (http://ddd.jp/js/print.js).

In the example of operational processing described with reference to FIG. 6, external files which cannot be acquired by the webpage print server 106 are contained in the webpage to be printed. For example, external files cannot be acquired by the webpage print server 106 in the case of a website that requires a cookie held by a web browser when the external files of a webpage of a membership system or the like are acquired.

First, the web browser 301 of the client terminal 104 accesses the website 107 designated by the user to acquire the webpage (steps S601 and S602). The webpage acquisition processing actually includes a multiple sequence in which the HTML is acquired, and the multiple external files referenced in the HTML are acquired, but this is omitted from the figure.

The web browser 301 displays the acquired webpage. The user selects the bookmark "webpage printing" in a state where the webpage is being displayed. As a result, the bookmarklet is run, and the web browser 301 acquires the script file (print.js) from the script transmission unit 401 of the webpage print server 106 (steps S603 and S604). That is, the script transmission unit 401 transmits the script that causes transmission of the HTML of the webpage to the client device 104 in accordance with a request from the client device 104 running the bookmarklet.

Figure 8:
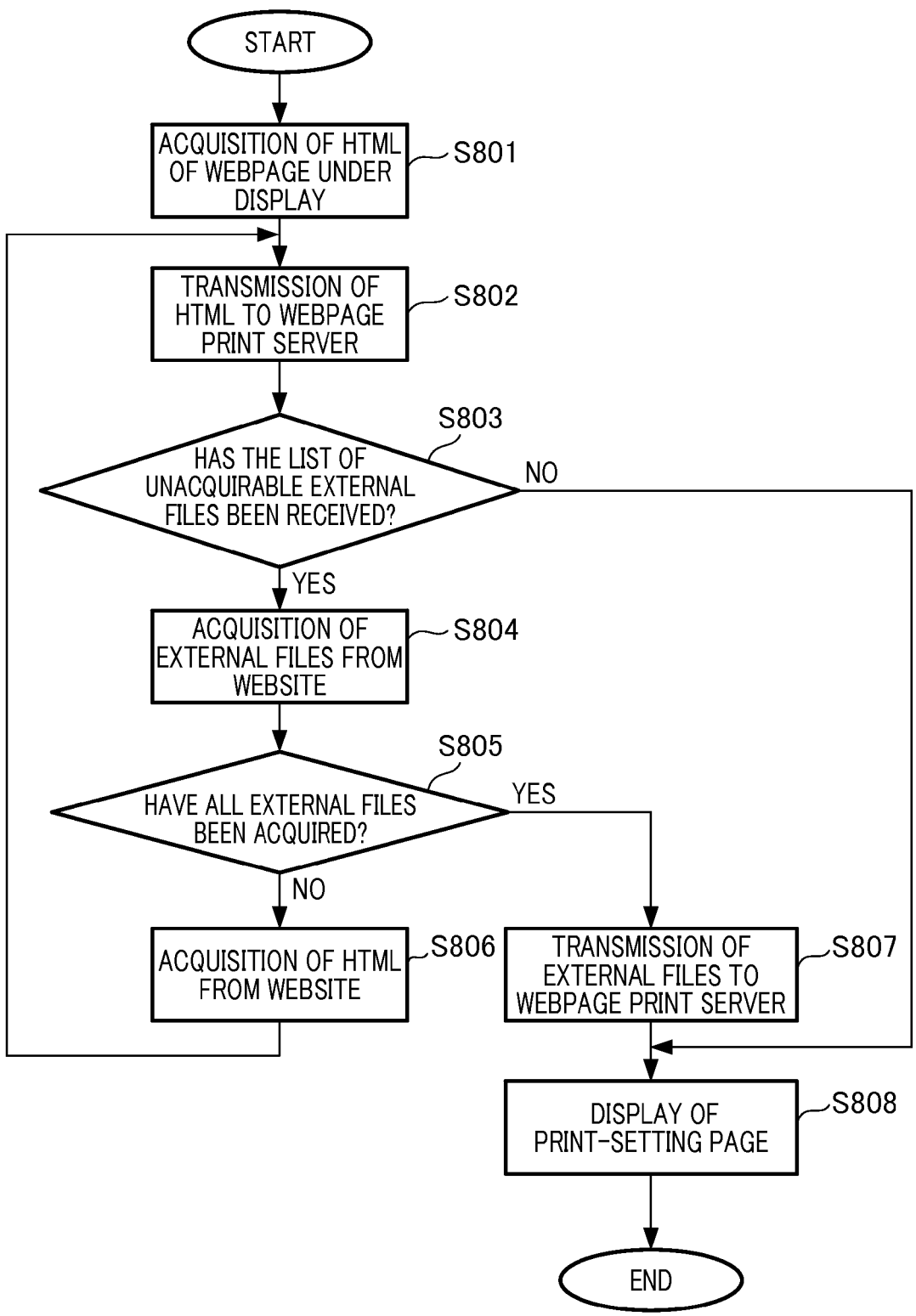
FIG. 8 is a flowchart which explains an example of operational processing of a web browser.

The script file (print.js) contains script that causes the web browser 301 to execute processing shown in the flowchart of FIG. 8. As a result of the processing shown in the flowchart of FIG. 8, a print-setting page is displayed in the client terminal 104 (S808 of FIG. 8). Therefore, execution of the bookmark "webpage printing" by the client terminal 104 signifies that a print request is issued to the webpage print server 106.

When the web browser 301 runs the script contained in the script file (print.js), the sequence of steps S605 to S614 is carried out. The web browser 301 acquires the HTML of the webpage under display, and transmits it to the webpage print server 106 (step S605). For example, the web browser 301 transmits the HTML 501 shown in FIG. 5A.

The webpage print server 106 which has received the HTML from the web browser 301 interprets the HTML. That is, the HTML interpretation unit 405 shown in FIG. 4 functions as an interpretation unit which interprets the HTML of the webpage displayed in the web browser 301 that was transmitted together with a print request from the client device 104. The external file list preparation unit 406 then drafts an external file list in accordance with an external data reference command that is contained in the HTML obtained as a result of the interpretation by the HTML interpretation unit 405. Specifically, the HTML interpretation unit 303 extracts the underlying portions shown by reference numerals 502 to 509 of the HTML of FIG. 5A, and the external file list preparation unit 406 drafts the external file list shown in FIG. 5B using this extraction result.

The external file acquisition unit 403 of the webpage print server 106 acquires the external files from the website 107 according to the prepared external file list (steps S606 and S607). External file acquisition actually includes a multiple sequence of acquiring multiple external files, but this is omitted from the figure.

When external files have been acquired from the website 107, the webpage print server 106 deletes the URLs of the acquired external files from the external file list. In the case where the external file list is not emptied as a result of executing acquisition of all external files (there are external files that could not be acquired), the webpage print server 106 returns the external file list to the web browser 301 (step S608).

In the case where an external file list is included in the response from the webpage print server 106, the web browser 301 acquires the external files contained in the list from the website 107 (step S609 and S610).

In the case where multiple external files are contained in the list, external file acquisition actually includes a multiple sequence, but this is omitted from the figure. The web browser 301 transmits the acquired external files to the webpage print server 106 (steps S611 and S612). The web browser 301 acquires a print-setting page from the webpage print server 106 (steps S613 and S614), and displays it.

Figure 7:
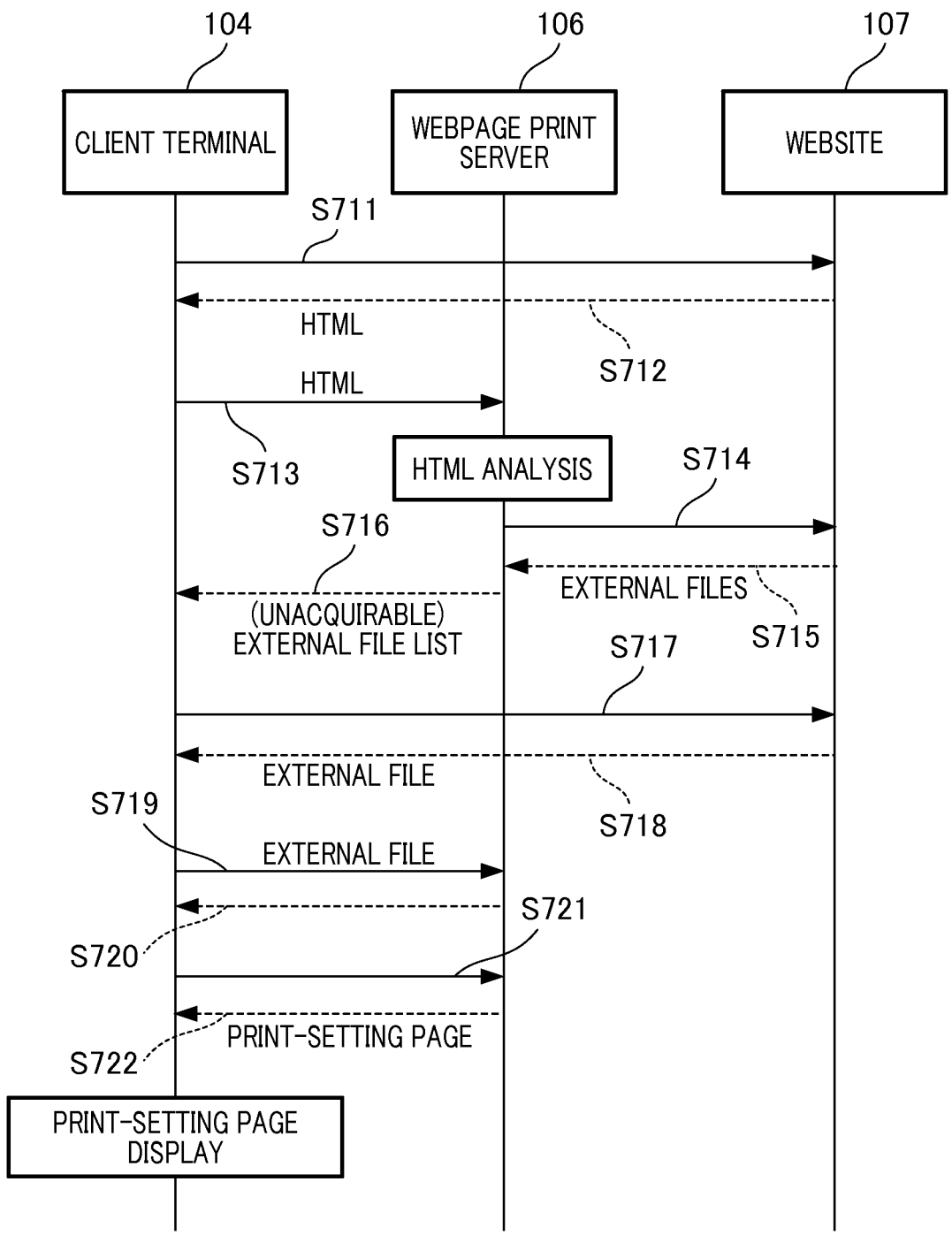
FIG. 7 is a drawing which describes another example of operational processing of a print system.

FIG. 7 is a drawing which describes another example of operational processing of the print system of the present embodiment. The case is assumed where external files that cannot be reacquired from the website 107 are included in the external file list returned to the web browser 301 from the webpage print server 106 in step S608 of FIG. 6. For example, in the case of a website 107 in which the external files referenced in the HTML are dynamically generated, and are only returned once, the web browser 301 cannot reacquire the external files. In short, the web browser 301 cannot acquire the pertinent external file list in steps S609 and S610 of FIG. 6.

In this case, instead of the processing in steps S611 to S614 of FIG. 6, the following steps S711 to S722 of FIG. 7 are performed. First, the web browser 301 reacquires the HTML of the webpage under display from the website 107 (steps S711 and S712). The reacquired HTML is an HTML different from the HTML that is transmitted to the webpage print server 106 from the web browser 301 in step S605 of FIG. 6, and its referenced external files are also different. The web browser 301 transmits the reacquired HTML to the webpage print server 106 (step S713). The web browser 301 does not conduct processing in which the reacquired HTML is reflected in the display of the web browser 301. Accordingly, the display screen of the web browser 301 is not updated.

Specifically, in the case where the web browser 301 is unable to acquire external files by running scripts received from the webpage print server 106, the HTML acquisition unit 304 shown in FIG. 3 functions as a transmission unit that performs the following processing. The HTML acquisition unit 304 acquires the HTML of the webpage displayed by the web browser 301, and transmits it to the webpage print server 106. The HTML interpretation unit 303 of the webpage print server 106 interprets the HTML received from the HTML acquisition unit 304 of the client terminal 104. By this means, an external file list is redrafted. The external file acquisition unit 403 of the webpage print server 106 acquires the external files from the website 107 according to the redrafted external file list (steps S714 and S715).

According to the processing of the above-described steps S711 to S715, the following effects can be obtained. Even in the case where external files that cannot be reacquired from the website 107 are included in the external file list returned to the web browser 301 in step S608 of FIG. 6, the HTML and the external files can be provided to the webpage print server 106. In short, the web browser 301 reacquires the HTML, and the webpage print server 106 can acquire the external files referenced by the pertinent HTML based on the HTML reacquired by the web browser 301.

As the processing performed by the web browser 301 and the webpage print server 106 in steps S716 to S722 is identical to steps S608 to S614 of FIG. 6, description thereof is omitted. In the embodiment described with reference to FIG. 6 and FIG. 7, the web browser 301 runs the script acquired in S604 of FIG. 6, whereby the processing of steps S605, S609, S611, and S613 is performed. However, it is also acceptable to have the webpage print server 106 include script in a web browser-addressed response, and have the web browser 301 that receives the response run the script.

For example, it is also acceptable to have the script that is acquired in step S604 of FIG. 6 run the sequence of step S605, and have the script contained in the response of step S608 conduct the processing of steps S609 and S611, as described below. That is, when the webpage print server 106 acquires external files, in the case where the pertinent external files cannot be acquired, the script transmission unit 401 transmits a script for acquisition of the pertinent external files to the client terminal 104 in step S608 of FIG. 6.

In steps S609 and S610, the web browser 301 of the client terminal 104 runs the script received from the webpage print server 106, whereby the external files are acquired from the website 107. More specifically, the external file acquisition unit 305 of the web browser 301 functions as an acquisition unit which acquires external files that cannot be acquired by the webpage print server 106 by running the script provided by the webpage print server 106.

In step S611 of FIG. 6, the webpage print server 106 then acquires the external data acquired by the web browser 301 from the web browser 301. It should be noted that the web browser 301 may also conduct the processing of step S613 by running the script contained in the response of step S612. The same also applies with respect to FIG. 7.

FIG. 8 is a flowchart which describes an example of operational processing of a web browser. The script execution unit 306 of the web browser 301 performs the processing of steps S801 to S808. First, the web browser 301 acquires the HTML of the webpage under display (step S801). Subsequently, the web browser 301 transmits the HTML to the webpage print server 106 (step S802). Subsequently, the web browser 301 judges whether a list of unacquirable external files was received from the webpage print server 106 (step S803). As a response is returned from the webpage print server 106 in answer to the transmission of the HTML in step S802, the web browser 301 judges whether a list of unacquirable external files is included in this response. In the case where a list of unacquirable external files is not included in the response from the webpage print server 106, the web browser 301 judges that a list of unacquirable external files has not been received, and the processing advances to step S808.

In the case where a list of unacquirable external files is included in the response from the webpage print server 106, the web browser 301 judges that a list of unacquirable external files has been received, and the processing advances to step S804. In step S804, the web browser 301 acquires the external files contained in the list from the website 107 (step S804).

Next, the web browser 301 judges whether all of the external files contained in the list have been acquired (step S805). In the case where some or all of the external files contained in the list have not been acquired, the web browser 301 acquires the HTML of the webpage under display in the web browser 301 (step S806), and the processing returns to step S802.

In the case where all of the external files contained in the list have been acquired, the web browser 301 transmits the acquired external files to the webpage print server 106 (step S807). Subsequently, the web browser 301 displays the print-setting page 1001 (step S808). Specifically, the web browser 301 acquires the print-setting page 1001 from the webpage print server 106, and displays it.

Figure 9:
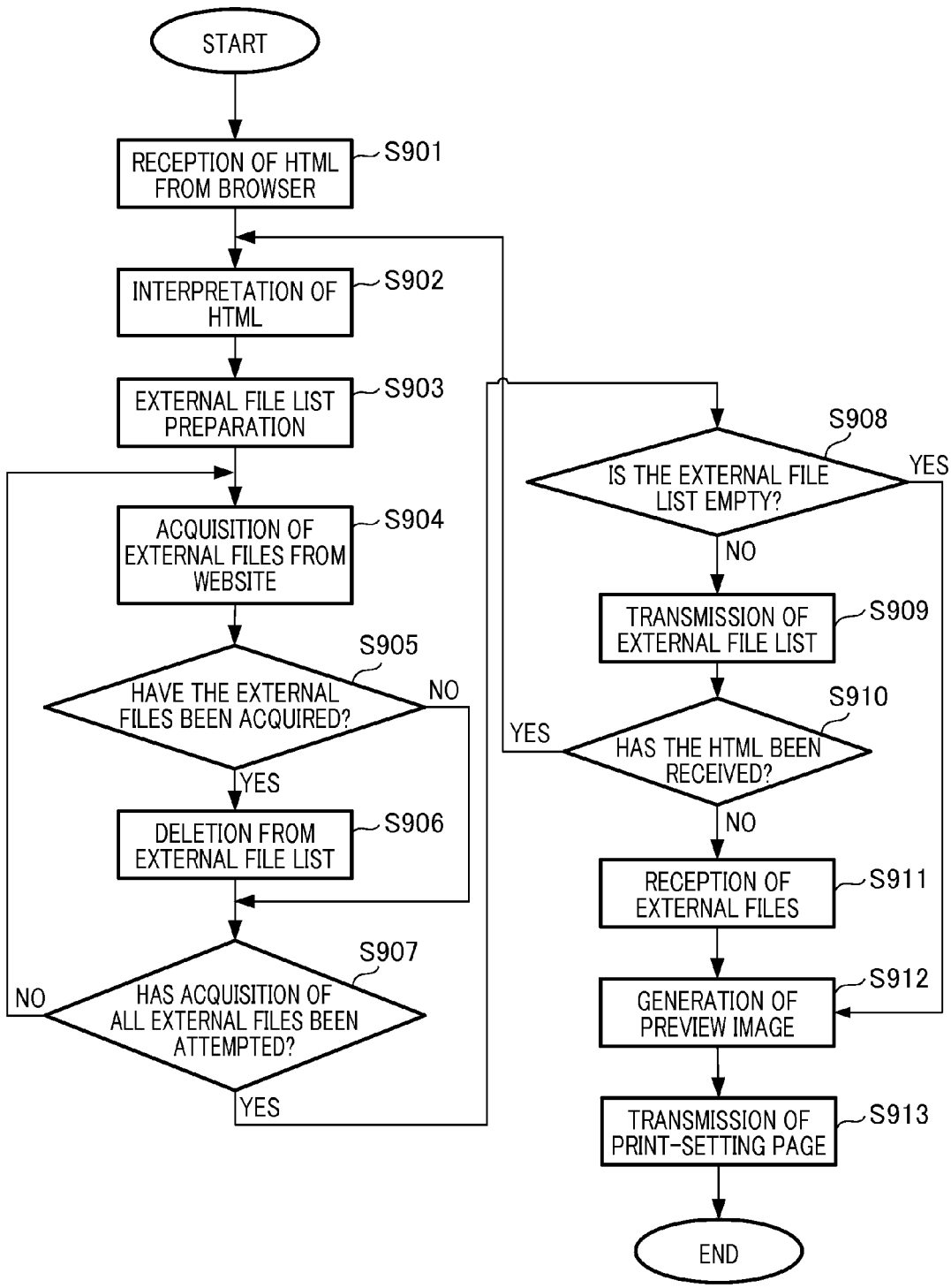
FIG. 9 is a drawing which describes an example of operational processing of a webpage print server.

FIG. 9 is a flowchart which describes an example of operational processing of a webpage print server. The HTML receiving unit 402 (FIG. 4) performs the processing of step S901. The HTML interpretation unit 405 performs the processing of step S902. The external file list preparation unit 406 performs the processing of step S903. The external file acquisition unit 403 performs the processing of steps S904 to S907. The external file list transmission unit 407 performs the processing of steps S908 and S909. The external file receiving unit 404 performs the processing of steps S910 and S911. The preview image generation unit 410 performs the processing of step S912. The print-setting page transmission unit 411 performs the processing of step S913.

First, the webpage print server 106 receives the HTML under display from the web browser 301, and stores the received HTML in the temporary internet file storage unit 420 as a temporary internet file (step S901).

Next, the webpage print server 106 interprets the HTML received in step S901. The webpage print server 106 prepares a list of the external files referenced in the HTML based on the HTML interpretation result (step S903).

Next, the webpage print server 106 acquires the external files shown by the external file list prepared in step S903 from the website 107 (step S904). Subsequently, the webpage print server 106 judges whether the external files have been acquired (step S905).

In the case where the external files have not been acquired, the processing advances to step S907. In the case where the external files have been acquired, the webpage print server 106 deletes the URLs of the acquired external files from the external file list (step S906). In step S906, the webpage print server 106 also stores the acquired external files as temporary internet files.

Next, the webpage print server 106 judges whether acquisition has been attempted for all of the external files shown by the external file list (step S907). In the case were there are external files for which acquisition has yet to be attempted, the processing returns to step S904.

In the case where acquisition of all external files has been attempted, the processing proceeds to step S908. Subsequently, the webpage print server 106 judges whether the external file list is empty (step S908). In the case where the external file list is empty, the processing proceeds to step S912. In the case where the external file list is not empty, the processing proceeds to step S909.

Next, the webpage print server 106 returns the external file list to the web browser 301 (step S909). Subsequently, the webpage print server 106 judges whether the HTML has been received from the web browser 301 (step S910). The judgmental processing in step S910 is processing which judges whether transmission processing has been conducted for the HTML that was reacquired in step S713 of FIG. 7. The reason why the judgmental processing of step S910 is conducted is that, in the case where the webpage print server 106 has received a reacquired HTML from the web browser 301, it is necessary to interpret the reacquired HTML, and acquire the external files. In the case where the webpage print server 106 judges that the HTML has been received from the web browser 301, the webpage print server 106 overwrites the HTML of the temporary internet file, and the processing returns to step S902.

In the case where the webpage print server 106 judges that the HTML has not been received from the web browser 301, the processing advances to step S911. Subsequently, the webpage print server 106 receives the external files from the web browser 301 (step S911), and saves them as temporary internet files.

Next, the webpage print server 106 generates a preview image based on the HTML and the external files stored as temporary internet files (step S912). The webpage print server 106 then generates the print-setting page 1001 containing the prepared preview image, and transmits the generated print-setting page 1001 to the web browser 301 (step S913). That is, the print-setting page transmission unit 411 functions as a setting screen transmission unit which generates print-setting screen data (the print-setting page 1001) containing the preview image generated in step S912, and which transmits it to the client device 104.

Figure 10:
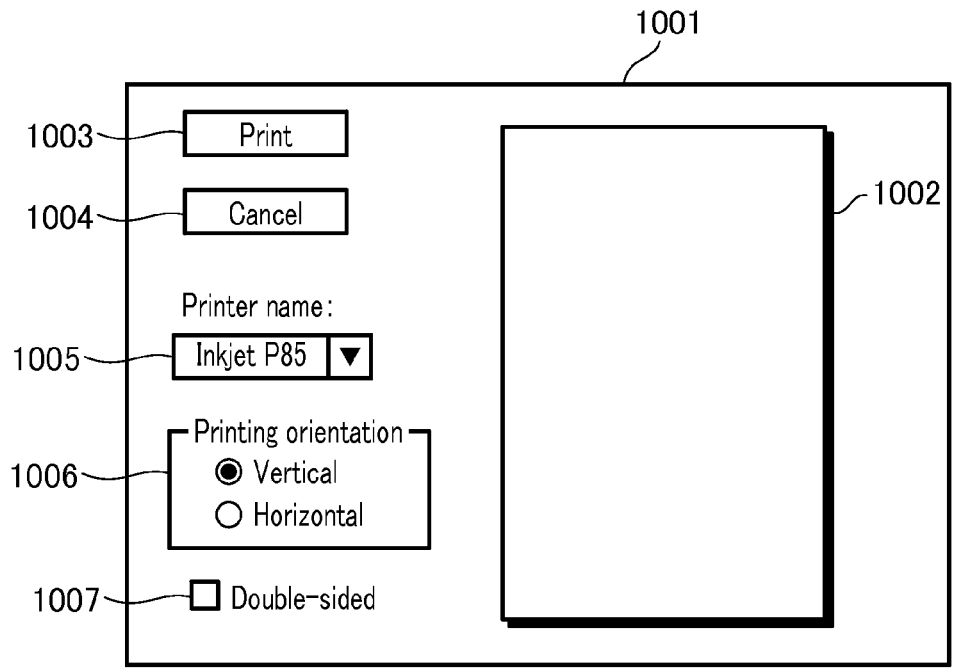
FIG. 10 shows an example of a print-setting page.

FIG. 10 is a drawing which shows an example of a print-setting page. The web browser 301 of the client terminal 104 conducts screen display of the print-setting page 1001 received from the webpage print server 106 as shown in FIG. 10. The print-setting page 1001 includes a preview image 1002, a print button 1003, and a cancel button 1004. In addition, the print-setting page 1001 includes a list box 1005 for selecting the printer that is the printing destination, a radio button 1006 for designating the orientation of printing, and a check box 1007 for designating double-sided printing. When the user presses down on the print button 1003, a print request is transmitted to the webpage print server 106 pursuant to this pressing operation.

Figure 11:
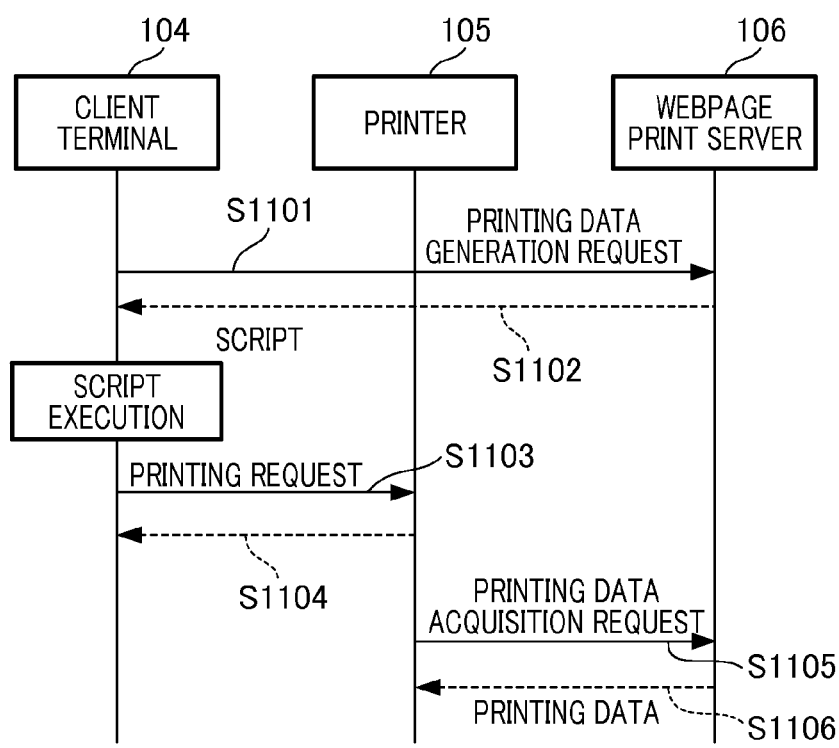
FIG. 11 is a sequence diagram which describes an example of webpage printing processing.

FIG. 11 is a sequence diagram which describes an example of webpage printing processing. On the print-setting page 1001 shown in FIG. 10, the printer that is the printing destination is selected, and the print button 1003 is pressed down (a printing instruction is issued). Pursuant to the pressing operation of the print button 1003, the client terminal 104 transmits a printing data generation request to the webpage print server 106 (step S1101).

The webpage print server 106 that has received the printing data generation request initiates generation of printing data based on the HTML and the external files stored as temporary internet files. That is, the printing data generation unit 408 shown in FIG. 4 functions as a generation unit which conducts the following processing based on the external data acquired in step S607 or S611 of FIG. 6, and the HTML acquired in step S604 of FIG. 6. The printing data generation unit 408 generates printing data corresponding to the webpage displayed in the web browser 301 of the client terminal 104. Subsequently, the webpage print server 106 returns the script of the printing request for transmitting to the printer 105 to the client terminal 104 (step S1102).

The script that is returned to the client terminal 104 in step S1102 includes a description for processing that invokes an interface for purposes of receiving a pull-print printing request that is issued by the printer 105. This printing request includes the URL of the webpage print server 106 for purposes of printing data acquisition by the printer 105.

The web browser 301 of the client terminal 104 runs the script, and transmits the printing request to the printer 105 (step S1103). The printer 105 that receives the printing request returns a response to the client terminal (step S1104). The printer 105 transmits the printing data request to the webpage print server 106 (step S1105). The webpage print server 106 that receives the printing data request transmits the printing data to the printer 105 if generation of the printing data has been completed (step S1106). The printer 105 receives the printing data, and carries out the printing.

In the present embodiment, the HTML of the webpage and the external files referenced in the HTML are provided by the same website, but it goes without saying that the HTML and the multiple external files may also be provided from respectively different websites. As described above, in the print system of the present embodiment, in the case where the server cannot acquire external files, the client acquires the external files, and transmits them to the server. Therefore, according to the print system of the present embodiment, with respect to a thin-client terminal in which the OS does not have a print function, the webpage under display can be printed with only the standard functions of the web browser.

With the present embodiment, in the case where the web browser 301 is unable to reacquire external files that have once been acquired from the website 107, the client terminal 104 reacquires the HTML, and transmits it to the webpage print server 106. Therefore, according to the print system of the present embodiment, even in the case where the web browser 301 is unable to reacquire external files from the website 107, the web browser can cause the printer to print the webpage under display.

With the present embodiment, the webpage print server 106 generates a preview image, and the client device 104 acquires a print-setting page including the preview image from the webpage print server 106. Therefore, according to the print system of the present embodiment, the user can issue a printing instruction after confirming a preview image.

With the present embodiment, the webpage print server 106 provides the client terminal 104 with a webpage that serves to install a bookmarklet. Therefore, according to the print system of the present embodiment, the user can record a bookmarklet in the bookmark of a web browser using a webpage provided from the webpage print server 106.

The webpage print server 106 transmits a printing request to the printer 105 via the web browser 301, and the printer 105 acquires printing data from the webpage print server 106. Therefore, according to the print system of the present embodiment, printing can be conducted even in an environment where it is impossible for the webpage print server 106 to connect to the printer 105 due to a firewall.

In steps S904 to S907 of FIG. 9, the webpage print server 106 attempts acquisition of external files, and deletes the URLs of acquired external files from the external file list. In other embodiments, it would also be acceptable to have the webpage print server 106 determine whether or not there are external files in the webpage print server 106, and to advance to step S909 without attempting acquisition of external files in the case where there are external files.

Otherwise, it would also be acceptable to record in advance a list of the URLs of unacquirable external files in the webpage print server 106, and to have the webpage print server 106 not attempt acquisition of external files with URLs falling under the list.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-029013 filed Feb. 14, 2012, which is hereby incorporated by reference herein in its entirety.

What is claimed is:

1. A print system comprising:
   a user device; and
   a print server which communicates with the user device via a network, wherein the print server comprises:
   an interpretation unit configured to interpret an HTML of a webpage that is displayed by a web browser of the user device, and that is transmitted from the user device together with a print request;
   a script transmission unit configured to transmit a script that causes acquisition of external data to the user device, in the case where the external data could not be acquired when acquiring the external data in accordance with an external data reference command that is contained in the HTML obtained as a result of the interpretation; and
   a generation unit configured to acquire external data from the user device who acquired the external data by running the script received from the print server, and to generate printing data corresponding to a webpage displayed by a web browser of the user device based on the acquired external data and the HTML,
   wherein the interpretation unit, the script transmission unit, and the generation unit are implemented by a processor and a memory.

2. The print system according to claim 1, wherein the user device comprises an acquisition unit configured to acquire external data that could not be acquired by the print server by running the script received from the print server.

3. The print system according to claim 1, wherein the user device comprises a transmission unit configured to acquire an HTML of a webpage displayed by the web browser, and to transmit it to the print server, in the case where the external data could not be acquired by running the script received from the print server, and wherein the interpretation unit provided with the print server interprets the HTML received from the transmission unit.

4. The print system according to claim 1, wherein the print server further comprises a setting screen transmission unit configured to generate print-setting screen data including a print preview image, and to transmit it to the user device.

5. The print system according to claim 1, wherein the script transmission unit provided with the print server transmits script that causes transmission of the HTML of a webpage to the user device in accordance with a request from the user device that executed a program for acquiring the script, the script been recorded in the web browser in advance and conducting processing related to printing of a webpage displayed by the web browser.

6. The print system according to claim 5, wherein the print server further comprises a delivery unit configured to deliver screen data used for purposes of recording the program in the web browser to the user device.

7. A print server that communicates with a user device via a network, the print server comprising:
   an interpretation unit configured to interpret an HTML of a webpage that is displayed by a web browser of the user device, and that is transmitted from the user device together with a print request;
   a script transmission unit configured to transmit a script that causes acquisition of external data to the user device, in the case where the external data could not be acquired when acquiring the external data in accordance with an external data reference command that is contained in the HTML obtained as a result of the interpretation; and
   a generation unit configured to acquire external data from the user device who acquired the external data by running the script received from the print server, and to generate printing data corresponding to a webpage displayed by a web browser of the user device based on the acquired external data and the HTML,
   wherein the interpretation unit, the script transmission unit, and the generation unit are implemented by a processor and a memory.

8. A method for controlling a print server that communicates with a user device via a network, the method comprising:
   interpreting the HTML of a webpage that is displayed by a web browser of the user device and that is transmitted from the user device together with a print request;
   transmitting script that causes acquisition of external data to the user device, in the case where the external data could not be acquired when acquiring the external data in accordance with an external data reference command that is contained in the HTML obtained as a result of the interpretation; and
   acquiring external data from the user device who acquired the external data by running the script received from the print server, and generating printing data corresponding to a webpage displayed by a web browser of the user device based on the acquired external data and the HTML.

9. A non-transitory storage medium on which is stored a computer program for making a computer execute a method for controlling a print server that communicates with a user device via a network, the method comprising:
   interpreting the HTML of a webpage that is displayed by a web browser of the user device and that is transmitted from the user device together with a print request;
   transmitting script that causes acquisition of external data to the user device, in the case where the external data could not be acquired when acquiring the external data in accordance with an external data reference command that is contained in the HTML obtained as a result of the interpretation; and acquiring external data from the user device who acquired the external data by the user device by running the script received from the print server, and generating printing data corresponding to a webpage displayed by a web browser of the user device based on the acquired external data and the HTML.

\* \* \* \* \*